(12) United States Patent
Oldroyd

(10) Patent No.: US 7,585,156 B2
(45) Date of Patent: Sep. 8, 2009

(54) STRAINED CAPABLE CONDUCTIVE/RESISTIVE COMPOSITE HYBRID HEATER FOR THERMAL ANTI-ICE DEVICE

(75) Inventor: Paul K. Oldroyd, Azle, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 480 days.

(21) Appl. No.: 11/441,269

(22) Filed: May 26, 2006

(65) Prior Publication Data

US 2007/0092371 A1 Apr. 26, 2007

Related U.S. Application Data

(60) Provisional application No. 60/684,984, filed on May 27, 2005.

(51) Int. Cl.
*B64C 27/46* (2006.01)
(52) U.S. Cl. ...................................... 416/230
(58) Field of Classification Search ............ 244/134 R, 244/134 D; 416/230, 39, 95
See application file for complete search history.

(56) References Cited

U.S. PATENT DOCUMENTS 4,841,124 A * 6/1989 Cox et al. ................... 219/201

6,031,214 A 2/2000 Bost

FOREIGN PATENT DOCUMENTS

| GB | 2 291 575 | | 1/1996 |
|----|-----------|---|--------|
| GB | 2291575 A | * | 1/1996 |
| WO | 98/53200 | | 11/1998 |

OTHER PUBLICATIONS

International Search Report issued in PCT/US2006/020377, dated Jun. 8, 2007, 6 pages.
Written Opinion of the International Search Authority in PCT/US2006/020377, dated Jun. 8, 2007, 5 pages.

* cited by examiner

*Primary Examiner*—Richard Edgar
(74) *Attorney, Agent, or Firm*—Pillsbury Winthrop Shaw Pittman LLP

(57) ABSTRACT

A rotor blade of a helicopter is presented. In an embodiment, the rotor blade includes a body; and a heating mat arranged in the body and configured to supply heat to said body. The heating mat includes a first plurality of fibers and a second plurality of fibers electrically connected to the first plurality of fibers. The first plurality of fibers define a positive angle smaller than about +45° relative to a first direction perpendicular to a longitudinal direction of the body. The second plurality of fibers define a negative angle greater than about −45° relative to the first direction.

25 Claims, 11 Drawing Sheets

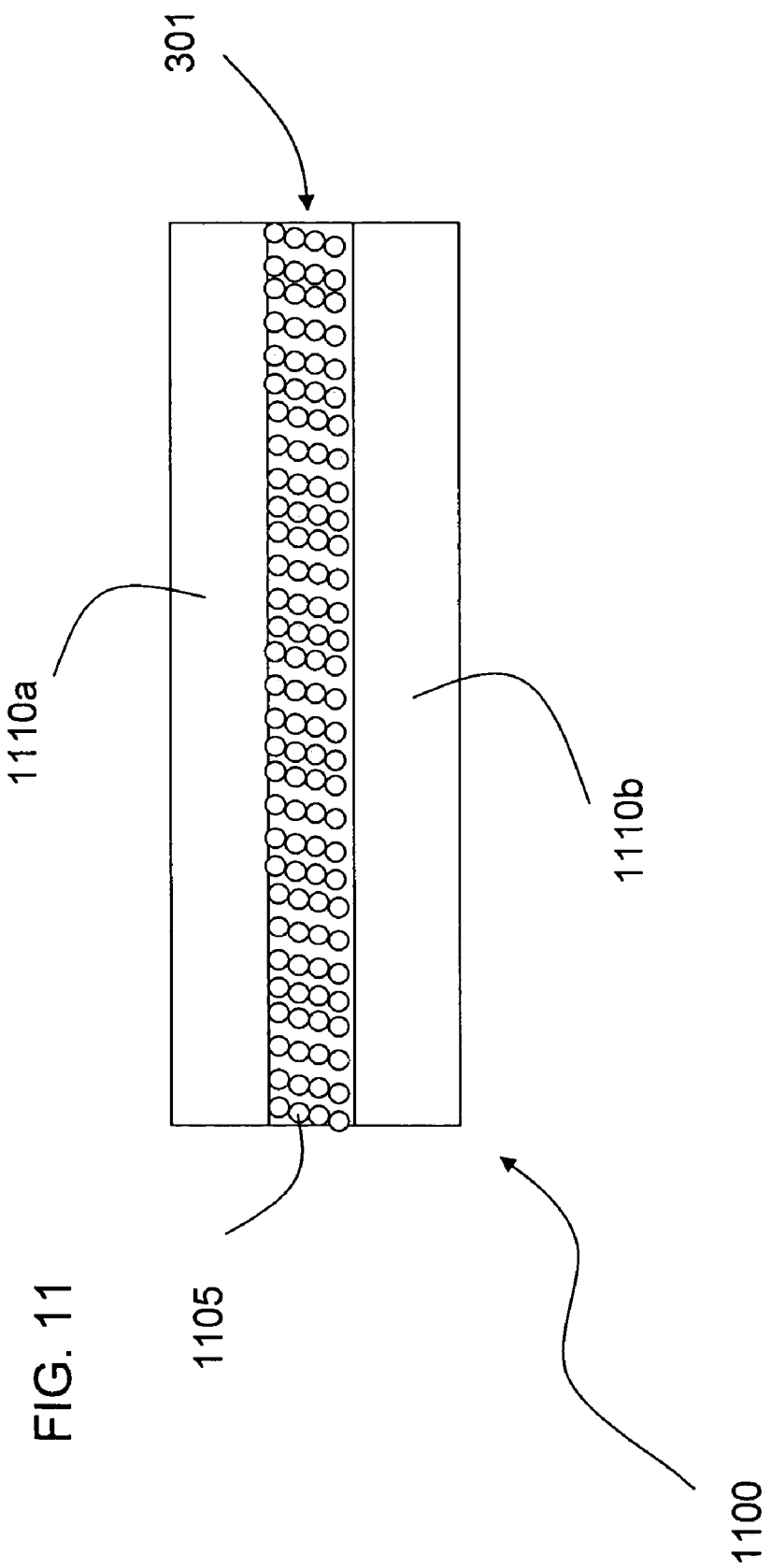

STRAINED CAPABLE CONDUCTIVE/RESISTIVE COMPOSITE HYBRID HEATER FOR THERMAL ANTI-ICE DEVICE

This application claims priority to Provisional Patent Application Ser. No. 60/684,984 filed on May 27, 2005, the content of which is incorporated herein by reference in its entirety.

BACKGROUND OF THE INVENTION

1. Field of the Invention

The present application relates to an anti-ice and de-ice device for structures subject to high strain, and more particularly, to a device for removing ice and preventing ice formation on a rotor blade of a helicopter.

2. Description of Related Art

Aircraft, during flight and/or while on the ground, may encounter atmospheric conditions that cause the formation of ice on airfoils and other surfaces of the aircraft structure, including wings, stabilizers, rudder, ailerons, engine inlets, propellers, fuselage and the like. Accumulation of ice, if not removed, can add excessive weight to the aircraft and alter the airfoil configuration, causing undesirable and/or dangerous flying conditions. General aviation aircraft are particularly susceptible to the detrimental consequences of ice formation because only small amounts of ice on structural members, such as wings, tail, propellers, and the like, can significantly alter flight characteristics.

De-ice and anti-ice devices including resistance heated elements are commonly used to prevent ice formation and remove ice on rotor blades of a helicopter. The resistance heated elements generally consist of wire elements or random carbon mat material. Because fabrication of wire elements is labor intensive, costly, operator sensitive and prone to shorts and electrical failure, the use of a random carbon mat material has typically been used. These resistance heated elements are usually arranged along the span of the blades with return paths for the electrical current so as to return the electrical current from the outboard to the inboard of the blades. The return paths are connected to a power supply, and a feedback control mechanism is used to adjust the electrical current that flows through the resistance heated elements.

Although a random carbon mat material offers uniform heat distribution, pliability, and ease of manufacture, this material is not highly strain tolerant. Therefore, its use in high-strain environment may be of concern. For example, tiltrotor aircrafts have the unique flexibilty to take-off and land like a helicopter, yet cruise at speeds and altitudes like a turbo-prop fixed wing. The Bell V22 aircraft and the Bell Augusta BA 609 aircraft are examples of such tiltrotor aircrafts. These versatile aircrafts use rotor blades that are much thicker than conventional helicopters. As a result, the strain induced by the flapping of the blades is much higher than in conventional helicopters. In such a high strain environment, a random carbon mat material may deteriorate quickly.

Having cruising capabilities of 25,000 ft., i.e. far beyond the envelope of a conventional helicopter, tiltrotor aircrafts must, however, be certified to fly in icing conditions and extreme climates, from Arctic to desert.

SUMMARY OF THE INVENTION

Embodiments of the invention include a rotor blade of a helicopter including a body; and a heating mat arranged in the body and configured to supply heat to the body, the heating mat including a first plurality of fibers and a second plurality of fibers electrically connected to the first plurality of fibers. The first plurality of fibers define a positive angle smaller than about +45° relative to a first direction perpendicular to a longitudinal direction of the body. The second plurality of fibers define a negative angle greater than about −45° relative to the first direction.

In another embodiment of the invention, there is provided a heating device for supplying heat to a rotor blade of a helicopter, the heating device including a heating mat arranged in the rotor blade. The heating mat includes a first plurality of fibers and a second plurality of fibers electrically connected to the first plurality of fibers. The first plurality of fibers define a positive angle smaller than about +45° relative to a first direction perpendicular to a longitudinal direction of the rotor blade. The second plurality of fibers define a negative angle greater than about −45° relative to the first direction.

In yet another embodiment of the invention, there is provided a rotor blade of a helicopter including a body; and a heating mat arranged in the body and configured to supply heat the body. The heating mat includes a woven fabric formed with bundles of conductive fibers oriented in a first direction and bundles of conductive fibers oriented in a second direction. The first direction defines a positive angle smaller than about +45° relative to a direction perpendicular to a longitudinal direction of the body. The second plurality of fibers defines a negative angle greater than about −45° relative to a direction perpendicular to a longitudinal direction of the body.

In an embodiment of the invention, there is provided a structure subject to high strain including a body; and a heating mat arranged in the body and configured to supply heat to the body. The heating mat includes a first plurality of fibers and a second plurality of fibers electrically connected to the first plurality of fibers. The first plurality of fibers define a positive angle smaller than about +45° relative to a first direction perpendicular to a longitudinal direction of the body, the second plurality of fibers define a negative angle greater than about −45° relative to the first direction.

BRIEF DESCRIPTION OF THE DRAWINGS

Embodiments of the invention will now be described, by way of example only, with reference to the accompanying drawings in which corresponding reference symbols indicate corresponding parts, and in which

FIG. 11 shows a cross section of the rotor blade in accordance with an embodiment of the invention.

DETAILED DESCRIPTION OF EMBODIMENTS OF THE INVENTION

Figure 1:
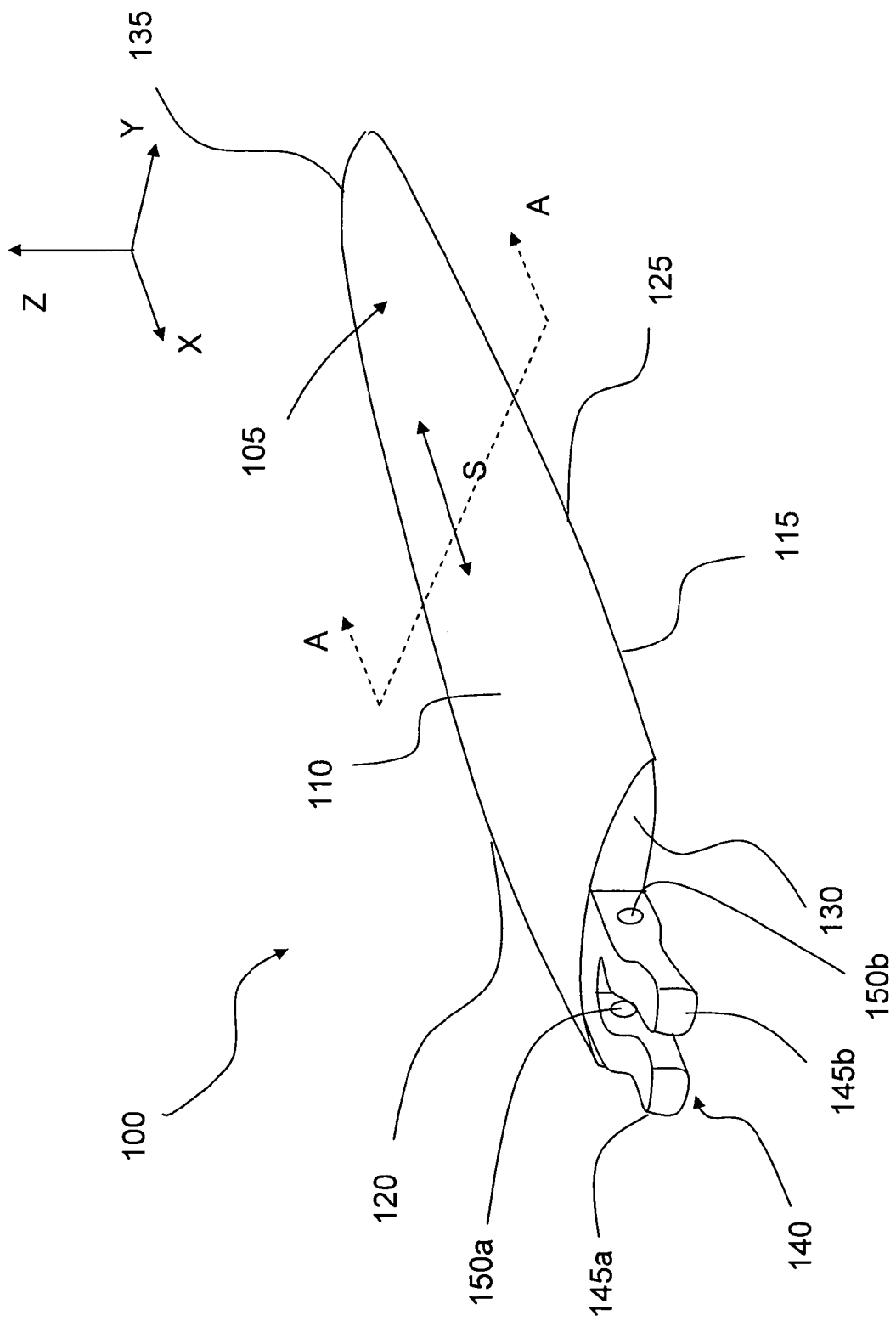
FIG. 1 is a schematic representation of a rotor blade of a helicopter in accordance with the embodiment of the invention.

FIG. 1 is a schematic representation of a rotor blade 100 of a helicopter (not shown) in accordance with an embodiment of the invention. Rotor blade 100 includes a body 105 having a suction face 110 and a pressure face 115 opposite the suction face 110. The rotor blade 100 also includes a leading edge 120, a trailing edge 125, and an inboard and an outboard end 130, 135. The leading edge 120 and the trailing edge 125 define the longitudinal contour of the body 105 and extend between the inboard end 130 and the outboard end 135. The body 105 of the rotor blade 100 has a tapering profile, as viewed in plane XZ, along the longitudinal direction of the blade 100 that extends from the inboard end 130 to the outboard end 135. In an embodiment, the inboard end 130 is about 10-15 inches thick. In its middle portion, the thickness of the rotor blade 100 is about 5-6 inches.

As known in the art, when the rotor blade 100 is moved through the air, a stream of air flows over the suction surface 110 and under the pressure surface 115. The rotor blade 100 is designed so that the flow of air is smooth and conforms to the shape of the moving rotor blade 100. When the rotor blade 100 is set at the proper angle and made to move fast enough, the airflow supports the weight of the rotor blade 100 and provides an upward force that furnishes enough lift to sustain the helicopter in flight.

Figure 2:
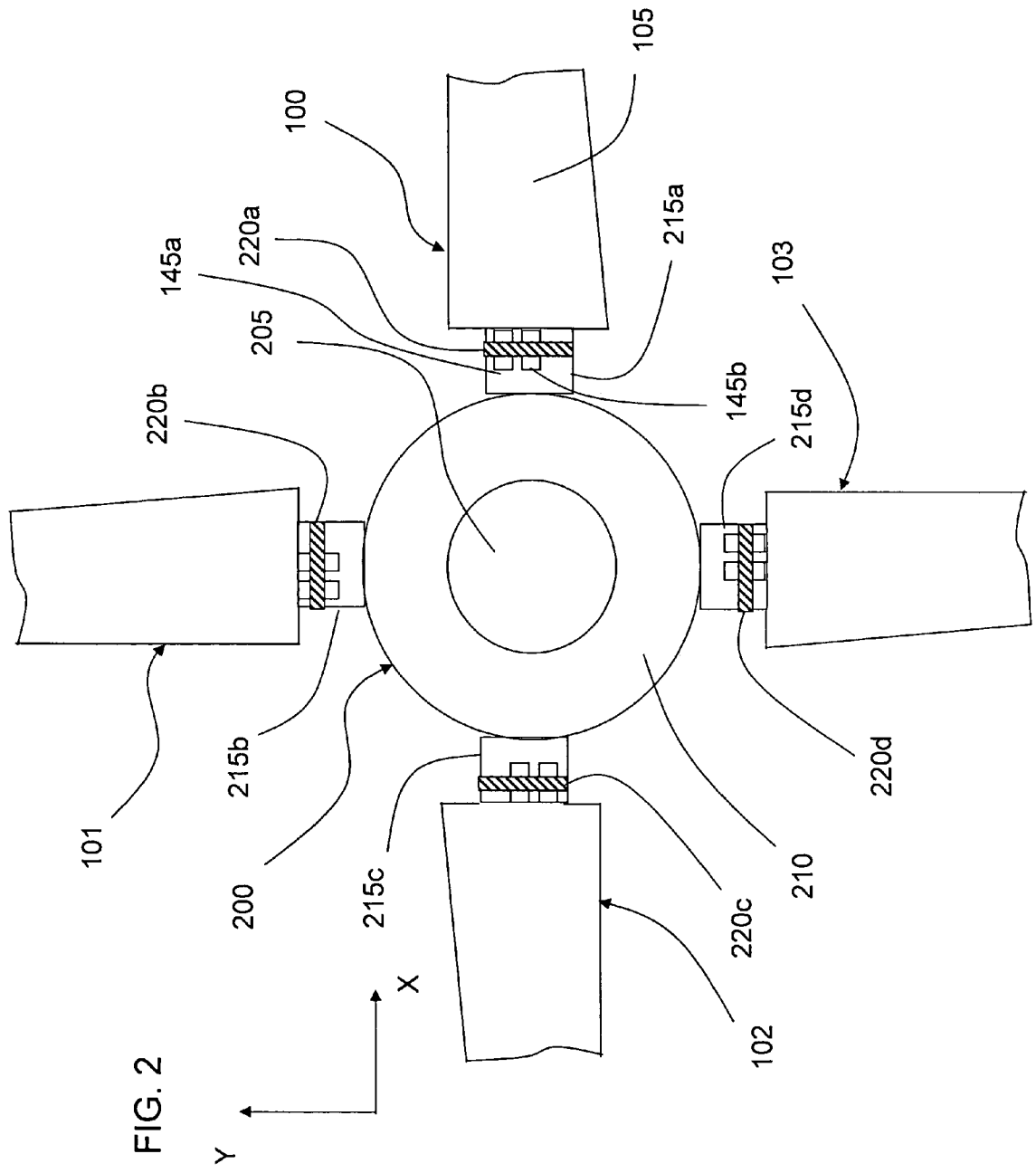
FIG. 2 shows a top view of several substantially identical rotor blades mounted to the rotor mast assembly of a helicopter in accordance with an embodiment of the invention.

The inboard end 130 includes an attachment device 140 for mounting the body 105 of the rotor blade 100 to a rotor mast 205 of a helicopter (see FIG. 2). Specifically, the attachment device 140 includes a first and a second generally parallel arm 145a, 145b that are each provided with a cylindrical opening 150a, 150b.

FIG. 2 shows a top view of several substantially identical rotor blades 100, 101, 102, 103 mounted to the rotor mast assembly 200 of a helicopter in accordance with an embodiment of the invention. To avoid redundancy, the discussion herein will focus on the attachment of the rotor blade 100, since the attachments of the other rotor blades 101, 102 and 103 to the rotor mast assembly 200 are substantially identical.

Rotor mast assembly 200 includes the rotor mast 205, a rotor hub 210, and a plurality of blade receiving portions 215a-d. The rotor hub 210 is slideably mounted to the rotor mast 205 and includes at a periphery thereof the plurality of blade receiving portions 215a-d. As can be seen in FIG. 2, generally parallel arms 145a, 145b of the rotor blade 100 are engaged in the blade receiving portion 215a. The rotor blade 100 is secured to the rotor mast assembly 200 via a shaft 220a which is inserted into cylindrical openings 150a, 150b.

In this embodiment, the rotor mast assembly 200 is configured to receive four substantially identical rotor blades. This rotor blade configuration may be used in a tiltrotor aircraft such as the Bell V22 aircraft and the Bell Augusta BA 609, but not limited to such aircraft. It will be appreciated that the rotor mast assembly 200 may be configured to receive additional or fewer rotor blades in other embodiments.

The rotor blade 100 is made of a material that is configured to withstand high-strain environments. Such high-strain environments are generally reached during flapping of the blades. Blade flapping conventionally refers to the up and down motion of the outboard end 135 of the body 105 during rotation of the rotor blade 100. The up and down motion of the outboard end 135 alternatively puts the suction face 110 and the pressure face 115 in tension and in compression. Blade flapping may be reached in various operation modes of a helicopter including, for example, high speed mode, high speed maneuver, or jump start.

The strain direction exerted on the body 105 of the rotor blade 100 during blade flapping is oriented in the longitudinal direction of the body 105 and identified by "S" in FIG. 1. In high-strain environments, such as those reached with tiltrotor aircrafts, it is desirable that the blade materials be able to withstand strain values from about 6000 to about 8000 µinch/inch strain. Such values indicate that the blade materials are configured to stretch up to 8000 micro-inches per inch of structure without breaking. These strain values are much higher than those typically reached with conventional helicopters due to the fact that tiltrotor blades are much heavier and rotate much faster. Generally, the air flowing above a tiltrotor blade is about 200 miles faster than in a conventional helicopter. Such high speed air flow significantly increases the loads exerted on the body 105 of the rotor blade 100. As a result, tiltrotor blades are generally made much stiffer to be able to react to such loads. Typically, strain values in tiltrotor aircrafts are about four times as high as those obtained with a conventional helicopter.

The rotor blade 100 may be a composite structure which may be fabricated using manufacturing techniques known in the art. Materials that may be used in an embodiment to manufacture the rotor blade 100 include, for example, epoxy resin and fiber glass. As known in the art, fiber glass fabrics are placed in a mold and impregnated with resin. The resin is then polymerized to form the composite structure.

Figure 3:
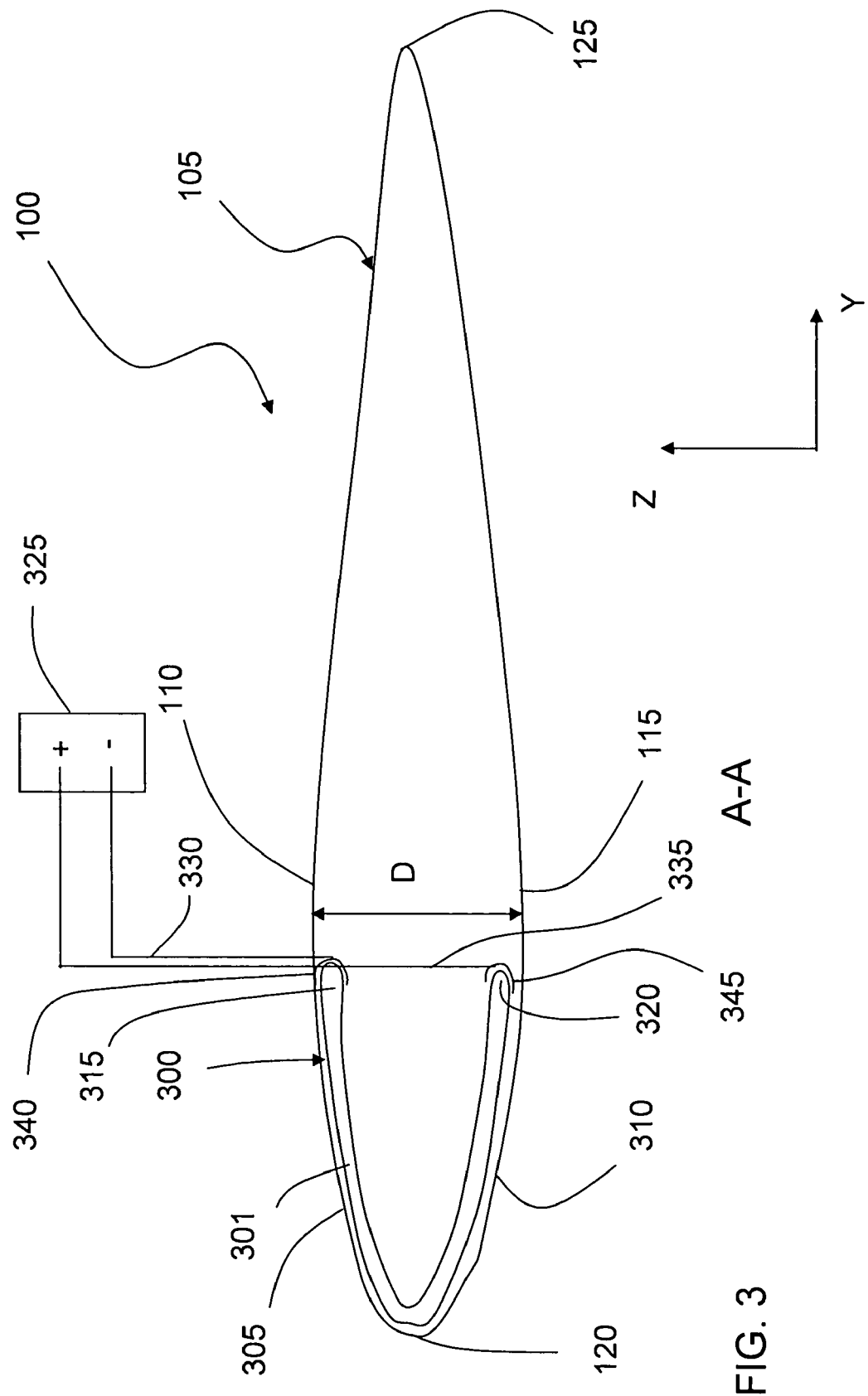
FIG. 3 shows a cross section AA of the rotor blade in accordance with an embodiment of the invention.

FIG. 3 shows a cross section AA of the rotor blade 100 (middle portion as shown in FIG. 1) in accordance with an embodiment of the invention. FIG. 3 shows the suction face 110, the pressure face 115, the leading edge 120 and the trailing edge 125. The leading edge 120 of the rotor blade 100 curves toward the trailing edge 125 with a shape which is, for example, parabolic. The maximum distance (identified as "D" in FIG. 3) between the suction face 110 and the pressure face 115 is about six inches in an embodiment of the invention.

Anti-icing and de-icing capabilities are provided to the rotor blade 100 with a heating device 300 that is housed within the body 105. The heating device 300 has the form of a continuous composite heating mat 301 that envelopes the leading edge 120 and portions of the suction and the pressure surface 110, 115. Specifically, the heating device 300 substantially covers a first region 305 of the suction surface 110 and a second region 310 of the pressure surface 115. The first and second regions 305 and 310 represent about a quarter of the total surface covered by the suction and the pressure surface 110, 115. Such surface coverage provides sufficient anti-icing and de-icing capabilities. Experiments have shown that ice is likely to be formed on portions 305, 310 of the rotor blade 100. It will be appreciated that the heating mat 301 may be made larger or smaller in other embodiments of the invention. Furthermore, the surface coverage of the first region 305 may be different from that of the second region 310.

Figure 4:
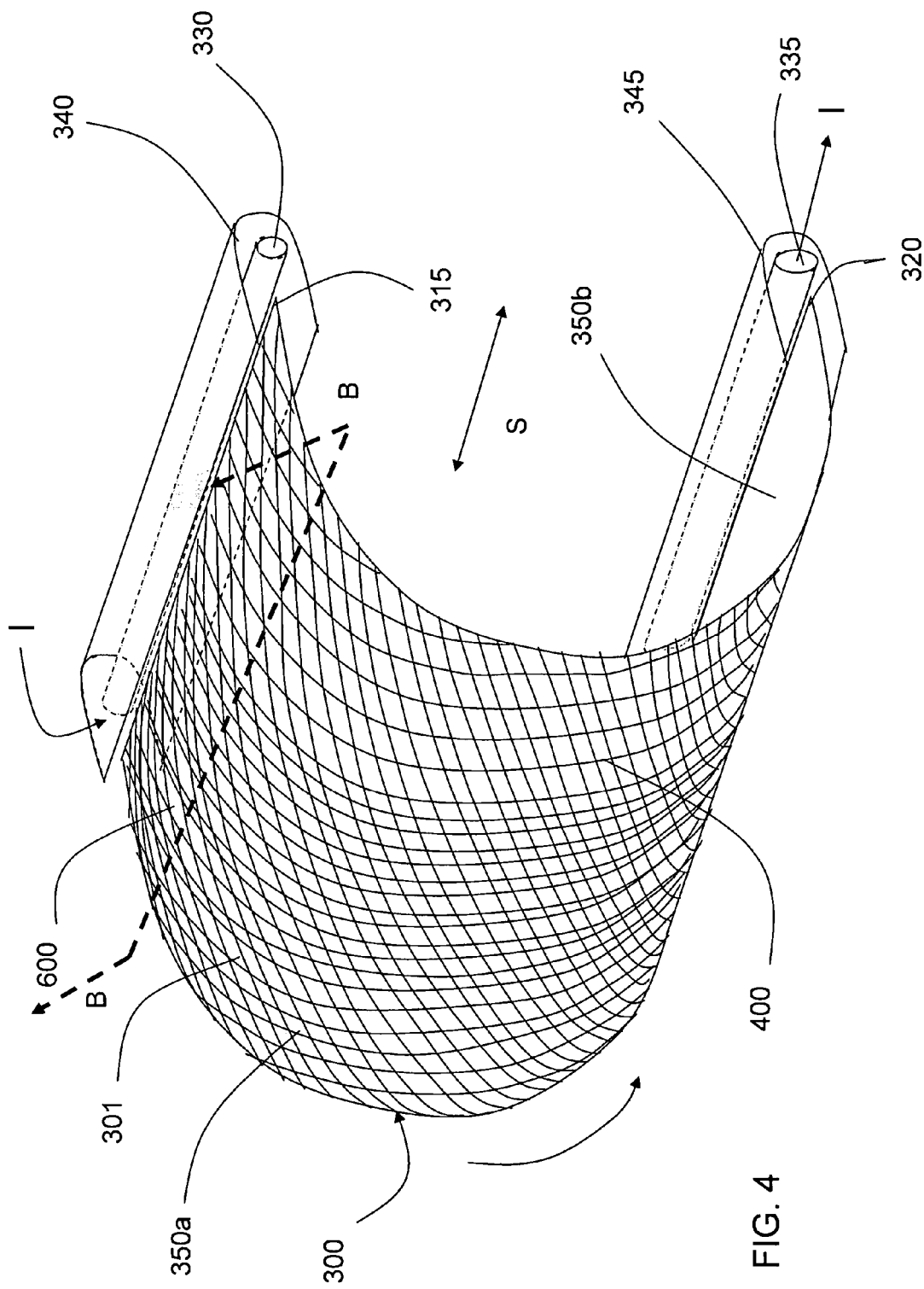
FIG. 4 shows a heating device in accordance with an embodiment of the invention.

The heating device 300 includes a first and second end 315, 320 that are connected to an electric power supply 325 arranged in the helicopter (not shown) via cables 330, 335. To ensure good electrical connection between the cables 330, 335 and the first and the second end 315, 320 of the heating device 300, metallic meshes 340, 345 may be used. Metallic meshes 340, 345 are arranged and folded along the first and the second ends 315, 320 so as to envelope the conducting cables 330, 335 and cover the two faces 350a, 350b of the heating mat 301, as shown in FIG. 4. Such arrangement can be viewed in FIG. 4, which represents a perspective view of the heating device 300.

The heating mat 301 may be configured to dissipate heat at a surface power density in the range from about 12 to about 30 W/inch$^2$ over the first and second regions 305, 310, in an embodiment of the invention.

FIG. 4 shows in greater detail the arrangement of the composite heating mat 301, cables 330, 335 and metallic meshes 340, 345. The heating mat 301 includes a plurality of specifically oriented fibers 400 that are arranged to allow strain in one direction and to carry current provided by the electric power source 325. In an embodiment, the fibers are made of carbon and the heating mat 301 is capable of withstanding strain values from about 6000 to about 8000 μinch/inch strain. In other embodiment of the invention, the fibers 400 may include boron or aluminum. The metallic meshes 340, 345 envelope the cables 330, 335 and cover the two faces 350a, 350b of the heating mat 301 so that electric current I supplied, e.g., to the cable 330 can flow to the heating mat 301 and can then return to the cable 335. The heating mat 301 acts as a resistive matrix that dissipates heat.

The heating mat 301 may include several layers of fibers (not shown in FIG. 4), as explained in more detail below. Each layer of fibers may include a plurality of individual fibers or a plurality of bundles of fibers. The layers of fibers may be laid on top of each other to form the heating mat 301. The heating mat 301 may be integrated within the rotor blade 100 in the following manner: the heating mat 301 may be placed on a pre-made substrate of epoxy/fiber-glass, then covered with fiberglass, and subsequently impregnated with resin. The resin may be polymerized to form the final composite structure.

Figure 5:
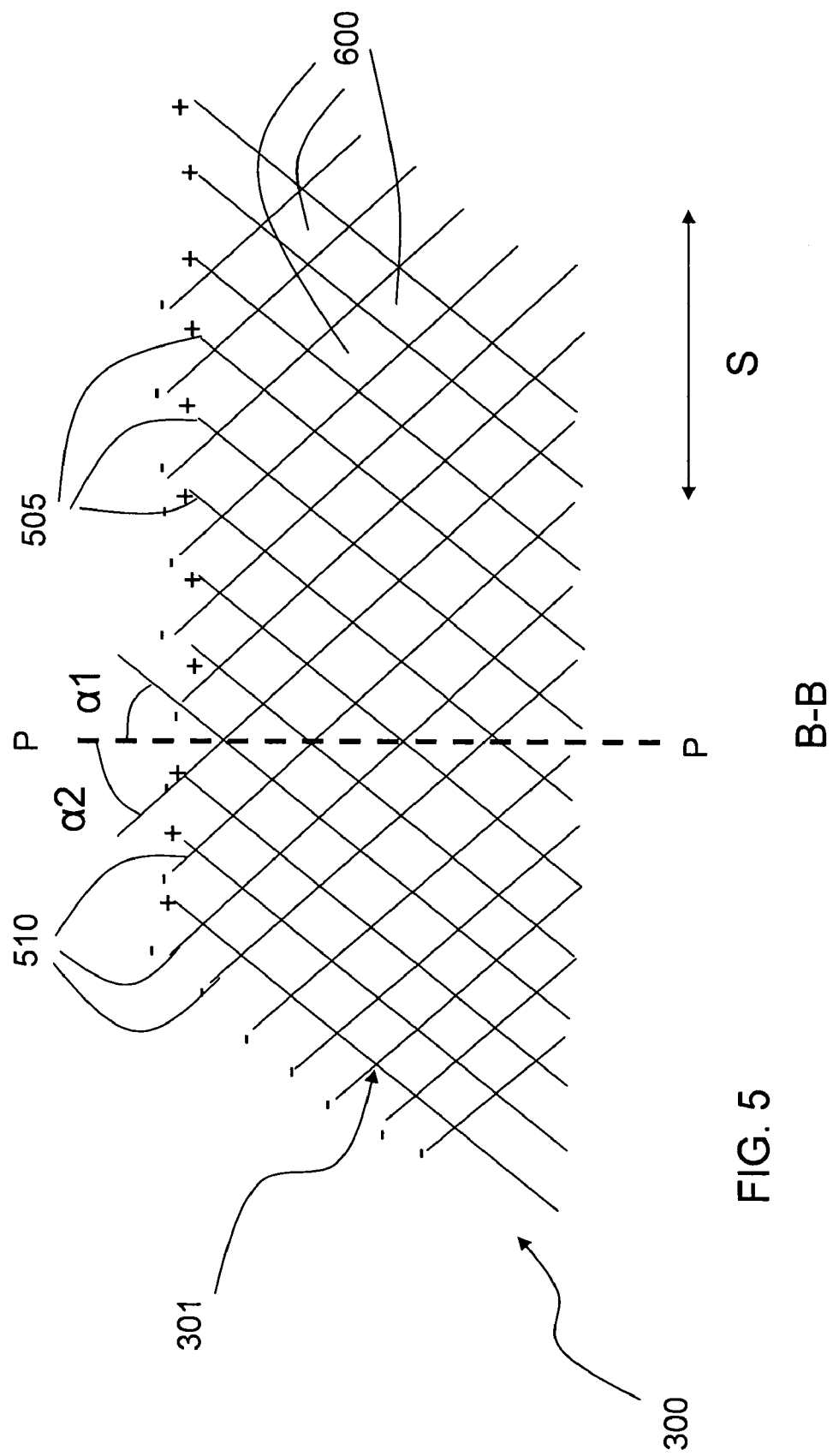
FIG. 5 shows a top view of the heating mat used in the heating device of FIG. 4.

As best seen in FIG. 5, which shows a top view BB of the heating device 300, the heating mat 301 includes a first plurality 505 of generally parallel fibers 400 oriented in a positive direction (identified as "+" in FIG. 5) and a second plurality 510 of generally parallel fibers 400 oriented in a negative direction (identified as "−" in FIG. 5). The positive and negative directions are oriented relative to the direction (identified as "PP" in FIG. 5) substantially perpendicular to the strain direction S. Each fiber 400 of the first plurality of fibers 505 defines a positive angle α1 with the perpendicular direction to the strain direction S. Conversely, each fiber 400 of the second plurality of generally parallel fibers 510 defines a negative angle α2 with the perpendicular direction to the strain direction S. In an embodiment of the invention, the absolute value of the positive angle α1 may be substantially the same as the absolute value of the negative angle α2. The orientation of the first and second plurality of conductive fibers 505, 510 is less than about +/−45° relative to the direction perpendicular to the strain direction S (i.e. α1<+45° and −45°<α2). In another embodiment of the invention, the first and second plurality of fibers 505, 510 may be oriented in the range from about +/−2° to about +/−25° relative to the direction perpendicular to the strain direction S (i.e. +2°<α1<+25° and −25°<α2<−2°). In the heating mat 301 of FIG. 4, the number of fibers oriented in the positive direction is substantially the same as the number of fibers oriented in the negative direction. However, it will be appreciated that the heating mat 301 may include more fibers arranged in the positive direction than in the relative negative direction, and vice versa.

The orientation of the fibers 400 at an angle less than about +/−45° relative to the direction perpendicular to the strain direction S provides a heating mat 301 that includes a plurality of trapezoids 600 of conductive fibers 400, as shown in FIG. 5. Such fiber arrangement may be capable of significantly increasing the resistance of the heating mat 301 to the strain S during blade flapping.

Figure 6:
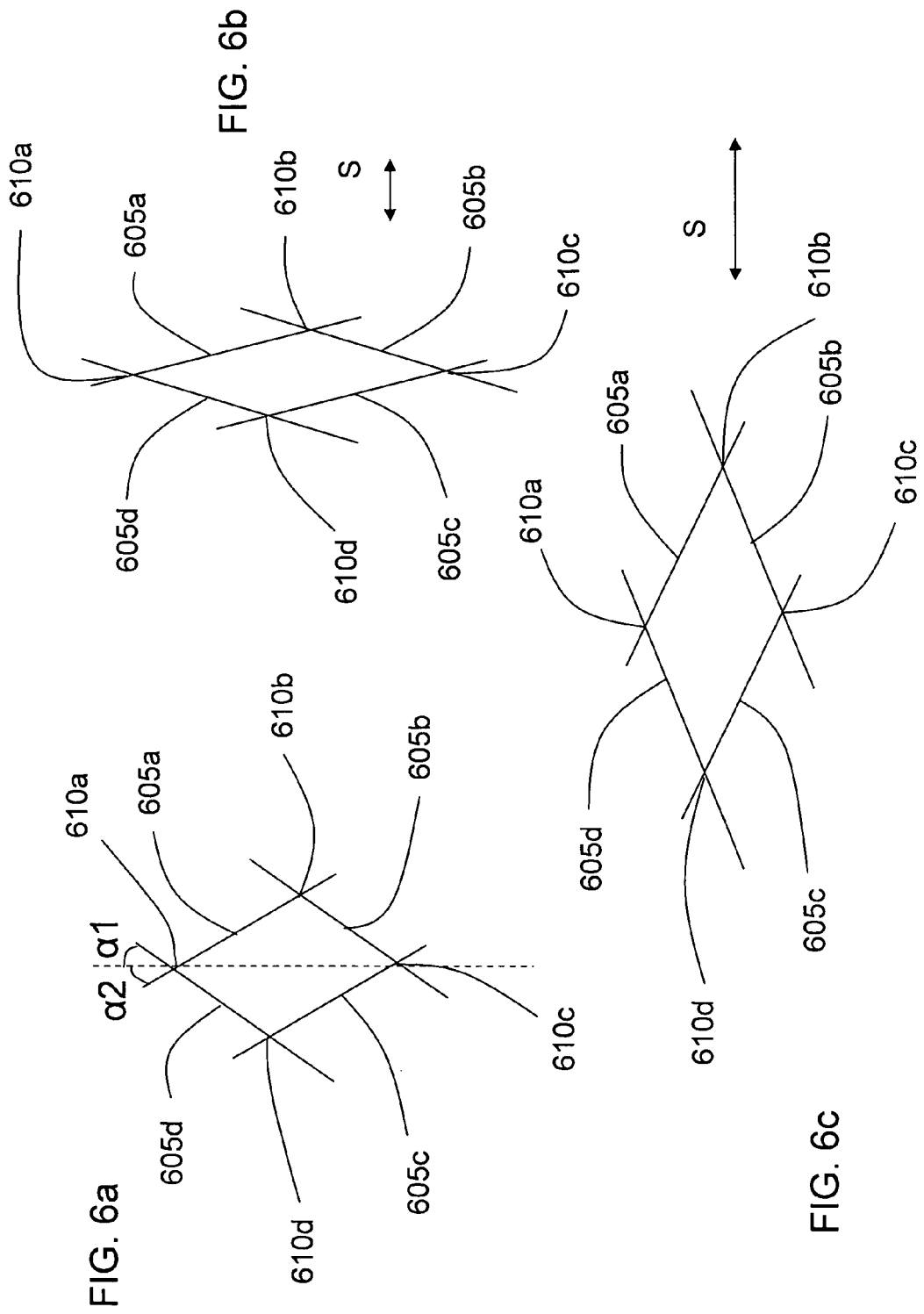
FIGS. 6a-c show the deformation of the heating mat of FIG. 5 during blade flapping.
Figure 7:
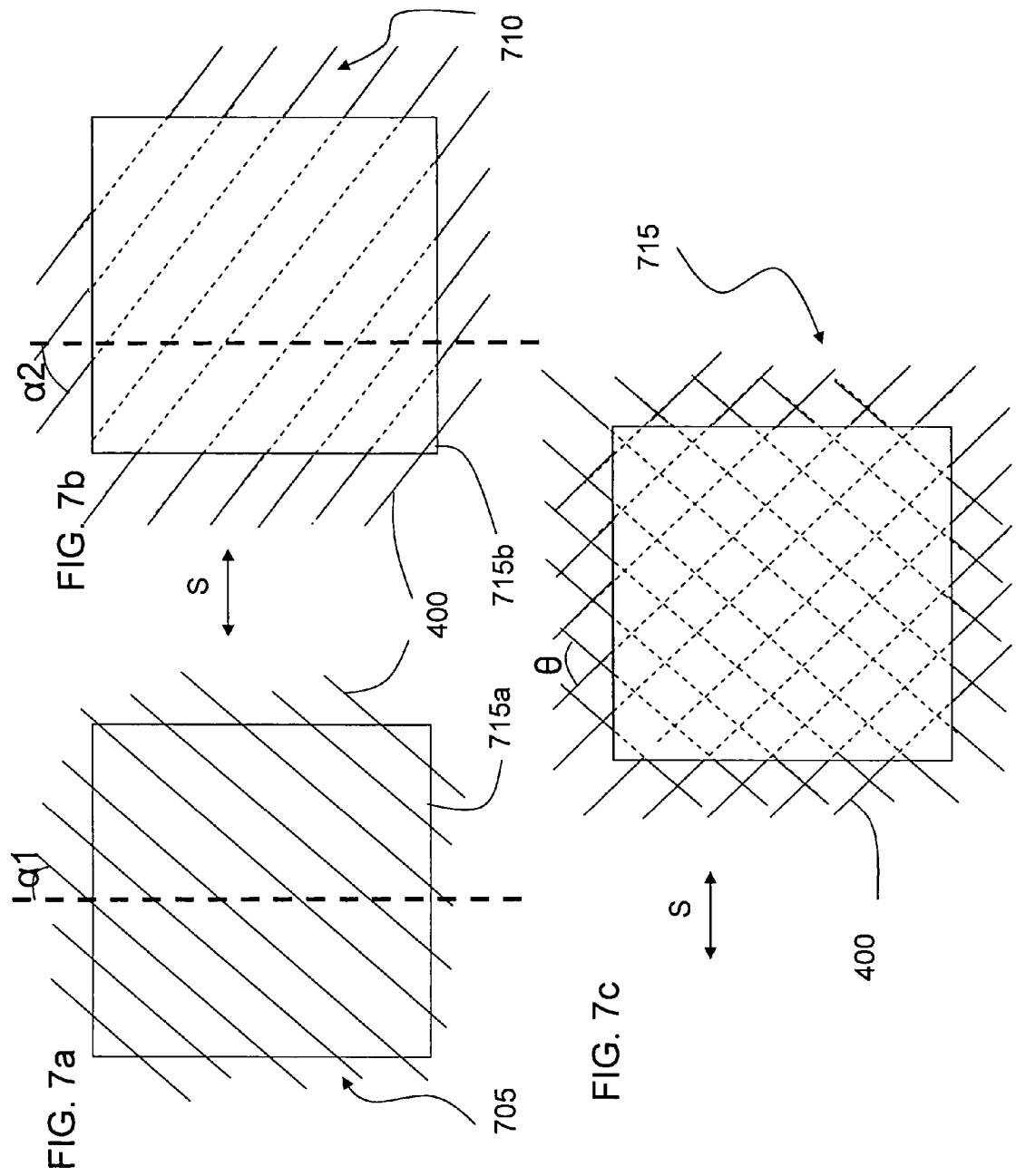
FIG. 7a-b shows unidirectional fiber sheets that are used to manufacture the heating mat of FIG. 5.
FIG. 7c shows a two-ply tape that is made with the unidirectional fiber sheets of FIGS. 7a-b, in accordance with an embodiment of the invention.

FIG. 6a shows a trapezoid 600 formed within the heating mat 301. In FIG. 6a, the strain exerted on the rotor blade 100 is substantially zero. The trapezoid 600 is located on the suction surface 110 of the rotor blade 100, as shown in FIG. 4. The trapezoid 600 is defined with a first, a second, a third and a fourth fiber 605a-d. The first, second, third and fourth fibers 605a-d are each coated with a conductive element, such as nickel or nickel-cadmium, and are electrically connected to each other at locations 610a-d. The angles defined by the fibers 400 relative to the direction perpendicular to the strain direction S is denoted by α1 and α2 in FIG. 6a. The strain S withstood by the trapezoid 600 is a function of cos α1 and cos α2.

The thickness of the fibers 400 and the distance between the fibers 400 of the heating mat 301 may be changed depending on the desired power density and the strain S exerted on the rotor blade 100. In an embodiment, the diameters of the fibers may be in the range from about 5 μm to about 8 μm. The distance separating the fibers 605b-605d and 605a-605c may vary from about the fiber diameter, to about 50-100 fiber diameters, up to 1000-12000 fiber diameters. In an embodiment, the trapezoid 600 may be from about 1/64 of an inch across to about 1/16 of an inch across, as measured between locations 610b-610d.

The trapezoid 600 is configured to scissor open and closed when subjected to the strain S. Specifically, when the suction surface 110 of the rotor blade 100 is in compression, the trapezoid 600 shrinks along the strain direction S and expands along the direction perpendicular to the strain direction, as shown in FIG. 6b. Conversely, when the suction surface 110 of the rotor blade 100 is in tension, the trapezoid 600 expands along the strain direction S and shrinks along the direction perpendicular to the strain direction S, as shown in FIG. 6c. With such fiber arrangement, the fibers 400 may withstand high strain values approaching 10,000 μinch/inch even when carbon is used. In FIGS. 6b-c, the fibers 605b-605d and 605a-605c are loaded in bending, not in tension.

Construction of the heating mat 301 will now be described with reference to FIGS. 7-10.

In a first implementation shown in FIGS. 7a-c, the heating mat 301 may be assembled with at least two unidirectional carbon fiber sheets 705, 710. Each carbon fiber sheet 705, 710 includes a resin substrate 715a, 715b, on which a plurality of generally parallel fibers 400 are arranged. In FIG. 7a, the carbon fibers 400 are arranged over the resin substrate 715a and in FIG. 7b, the carbon fibers 400 are arranged under the resin substrate 715b. In each sheet 705, 710, the plurality of fibers 400 are coplanar. Each sheet 705, 710 corresponds to one ply in which the fibers 400 are oriented relative to the perpendicular direction to the strain direction S with an angle α1, α2(θ=α1+α2). Each unidirectional fiber sheet 705, 710, or ply, is coated with a metallic element and the sheets 705, 710 are laminated together to form a two-ply tape 715, as shown in FIG. 7c. The metallic element may include nickel, or nickel-cadmium, and may be deposited by vapor phase deposition (e.g., PVD process). The metallic element coating thickness may vary from about half the fiber diameter to about fifty fiber diameters.

Figure 8:
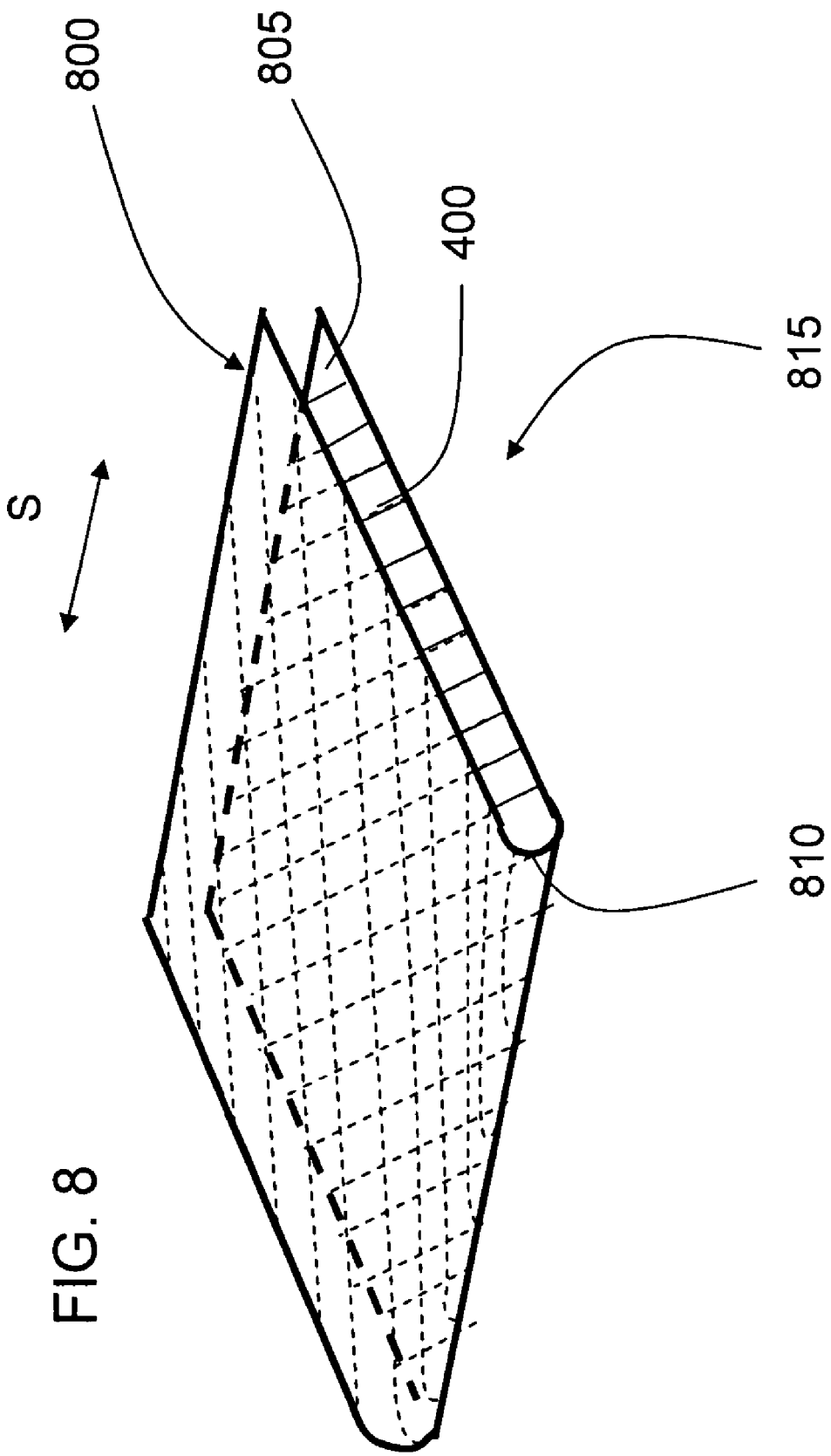
FIG. 8 shows a two-ply tape in accordance with an embodiment of the invention.

The heating mat 301 may also be formed with continuous plies of a thin unidirectional sheet 800, as shown in FIG. 8.

FIG. 8 shows a two-ply tape construction. The sheet 800 includes a substrate 805a and a plurality of generally parallel fibers 400, and is folded at location 810 to form a two-ply tape 815. The two-ply tape 815 is arranged within the rotor blade 100 such that the fibers 400 alternatively define a positive and a negative angle, between +/−45°, relative to the direction perpendicular to the strain direction S, as explained previously.

Figure 9:
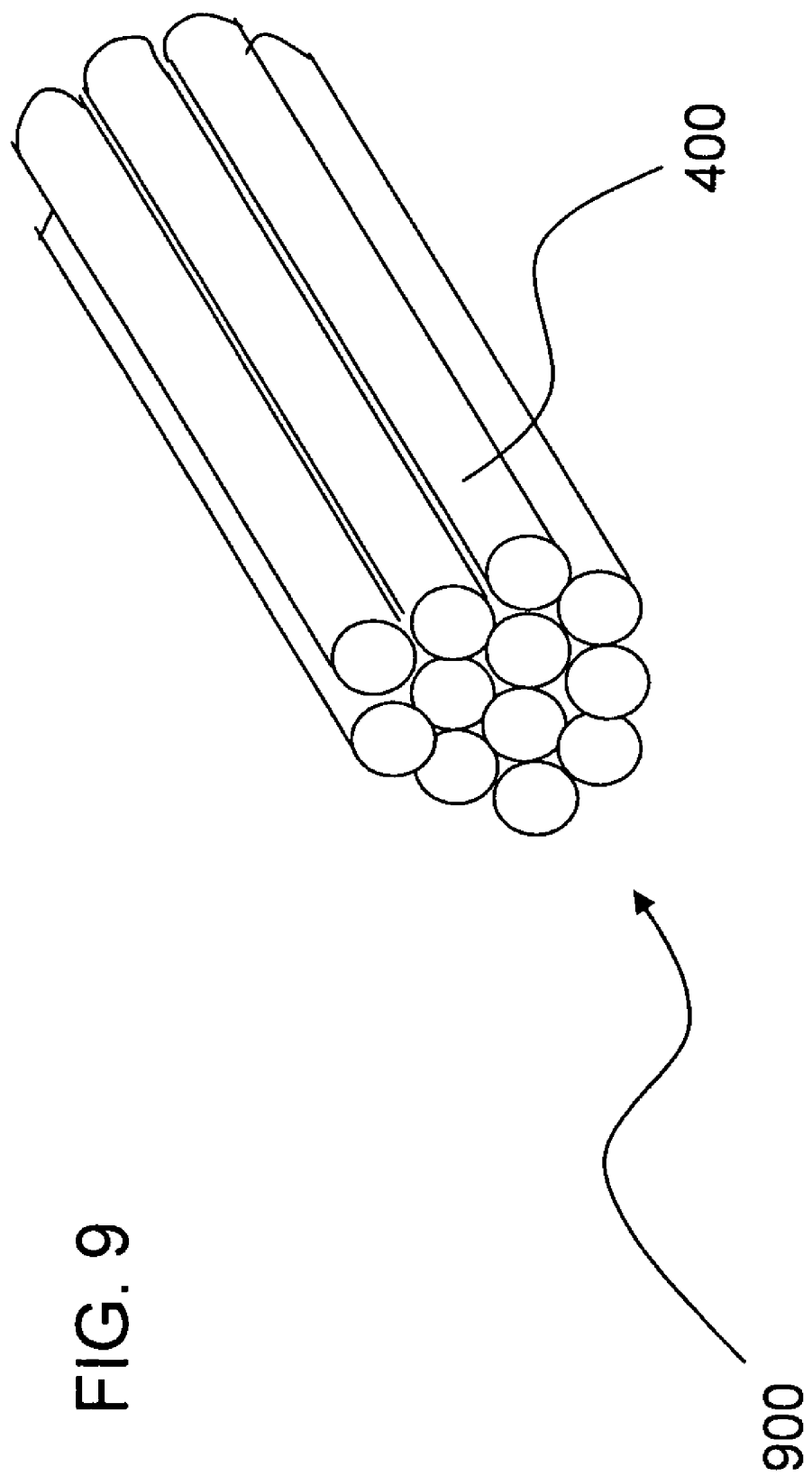
FIG. 9 shows a bundle of fibers in accordance with an embodiment of the invention.

In a second implementation, the heating mat 301 may include bundles of fibers 900, as shown in FIG. 9, and may be assembled in a similar manner as that described in the first implementation. That is, unidirectional carbon fiber sheets including generally parallel bundles of fibers 900 may be laminated together to form a two-ply tape in a similar manner as in FIGS. 7a-c. In FIGS. 7a-c, the fibers 400 may be replaced with bundles of fibers 900. Each unidirectional carbon fiber sheet including generally parallel bundles of fibers 900 may be coated with a metallic element, such as nickel or nickel-cadmium, and constitutes one ply. Each bundle 900 may include between 50 fibers and 12000 fibers. The generally parallel bundles of fibers 900 are oriented so as to form a positive and a negative angle, between about +/−45°, relative to the direction perpendicular to the strain direction S.

Alternatively, the heating mat 301 may also be formed in the second implementation with continuous plies of a single unidirectional sheet that includes bundles of fibers 900, in a same manner as in FIG. 8.

Depending on the desired power density, the number of plies may vary within the heating map 301. In an embodiment of the invention, the thickness of the heating mat 301 constituted by the fibers 400 and the metallic coating, may be between about 1/1000 of an inch to about 60/1000 of an inch.

Figure 10:
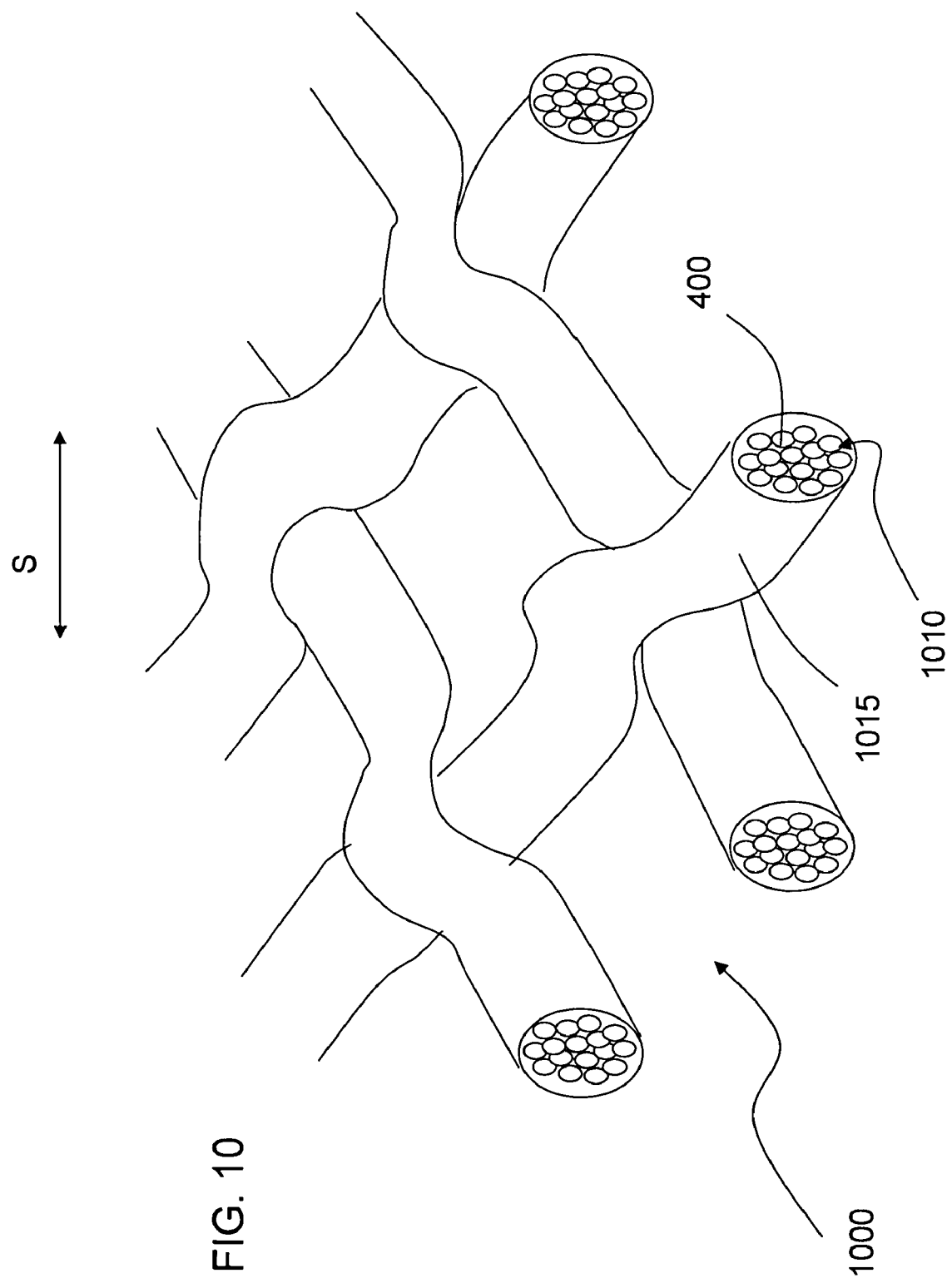
FIG. 10 shows a woven fabric of bundles of fibers in accordance with an embodiment of the invention.

In a third implementation, the heating mat 301 may include a fabric 1000 of woven bundles of carbon fibers 1010, as shown in FIG. 10. The bundles 1010 in the woven fabric 1000 are oriented so as to form a positive and a negative angle, between about +/−45°, relative to the direction perpendicular to the strain direction S. Each bundle 1010 may include between about 50 and 12000 fibers 400 and is covered with a metallic coating 1015. As explained previously, the metallic coating 1015 may include nickel, or nickel-cadmium, and may be deposited by vapor phase deposition (e.g., PVD process).

The fabric 1000 shown in FIG. 10 corresponds to a one-ply fabric in which each bundle 1010 goes over and under a neighboring bundle. Alternatively, the woven fabric 1000 may include bundles 1010 of fibers in which each bundle goes over one and under four neighboring bundles. This latter configuration may provide a looser woven fabric which may have better stretching capabilities.

The heating mat 301, which may include several layers of woven fabric 1000 or tape 715, may be encapsulated in a resin matrix within the rotor blade 100. The resin matrix may be a 85/52 resin system, which corresponds to a toughened epoxy system, as known in the art. Other conventional resin systems may be used in other embodiments of the invention.

FIG. 11 shows a cross section of the heating mat 301 after being encapsulated in a resin matrix. The heating mat 301 comprises a plurality of conductive coated fiber elements. Each conductive coated fiber element 1105 may include a bundle of fibers or an individual fiber. The plurality of conductive coated fiber elements 1105 are sandwiched between fiber glass layers 1110a-1110b.

It will be appreciated that the concepts disclosed herein are equally applicable to structures other than those illustrated herein in the attached figures. For example, the heating device disclosed above may be incorporated into other parts of aircrafts or other vehicles, in which such parts are used in high-strain environments.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention. For example, different materials may be used to assemble the heating mat.

The foregoing embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A rotor blade of a helicopter comprising:
   a body; and
   a heating mat arranged in said body and configured to supply heat to said body, said heating mat including a first plurality of fibers and a second plurality of fibers electrically connected to said first plurality of fibers, said second plurality of fibers being distinct from said first plurality of fibers;
   wherein said first plurality of fibers define a positive angle smaller than about +45° relative to a first direction perpendicular to a longitudinal direction of said body,
   wherein said second plurality of fibers define a negative angle greater than about −45° relative to said first direction, and
   wherein when said heating mat is laid substantially in a plane, said first plurality of fibers extend in a first direction and said second plurality of fibers extend in a second direction different from the first direction.

2. The rotor blade of claim 1, wherein said heating mat is configured to withstand strain values up to 10,000 μinch/inch along said longitudinal direction.

3. The rotor blade of claim 1, wherein said heating mat is arranged along a leading edge of said body.

4. The rotor blade of claim 1, wherein said first plurality of fibers and said second plurality of fibers define a plurality of trapezoids, said plurality of trapezoids being configured to scissor open or close when subject to strain.

5. The rotor blade of claim 4, wherein when a surface of the body is in compression, the plurality of trapezoids shrink along a direction of the strain and expand along a direction perpendicular to the direction of the strain, and when the surface of the body is in tension, the plurality of trapezoids expand along the direction of the strain and shrink along the direction perpendicular to the direction of the strain.

6. The rotor blade of claim 1, wherein said positive angle is between about +5° and +20° and wherein said negative angle is between about −20° and −5°.

7. The rotor blade of claim 1, wherein said heating mat is configured to dissipate heat at a power density in the range from about 12 to about 30 W/inch$^2$.

8. The rotor blade of claim 1, wherein said first plurality of fibers include separate bundles of fibers.

9. The rotor blade of claim 8, wherein said bundles of fibers include between 50 and 12,000 fibers.

10. The rotor blade of claim 1, wherein said first and said second plurality of fibers are coated with metal.

11. The rotor blade of claim 10, wherein said metal includes nickel or nickel-cadmium.

12. The rotor blade of claim 1, wherein said first and said second plurality of fibers include carbon, boron or aluminum.

13. The rotor blade of claim 1, wherein said first plurality and said second plurality of fibers are arranged to form a woven fabric.

14. The rotor blade of claim 13, wherein said woven fabric includes bundles of fibers that each go over and under a neighboring bundle.

15. The rotor blade of claim 13, wherein said woven fabric includes bundles of fibers that each go over one and under four neighboring bundles.

16. The rotor blade of claim 1, wherein said first plurality of fibers and said second plurality of fibers have substantially a same number of fibers.

17. The rotor blade of claim 1, wherein said heating mat includes continuous plies of a unidirectional fiber tape.

18. The rotor blade of claim 1, wherein fibers in said first plurality of fibers are substantially parallel to each other.

19. The rotor blade of claim 1, wherein said heating mat is encapsulated in a epoxy fiber glass matrix.

20. The rotor blade of claim 1, wherein said rotor blade is a tiltrotor blade.

21. A heating device for supplying heat to a rotor blade of a helicopter, said heating device comprising a heating mat arranged in said rotor blade, said heating mat comprising:
   a first plurality of fibers and a second plurality of fibers electrically connected to said first plurality of fibers, said second plurality of fibers being distinct from said first plurality of fibers;
   wherein said first plurality of fibers define a positive angle smaller than about +45° relative to a first direction perpendicular to a longitudinal direction of said rotor blade,
   wherein said second plurality of fibers define a negative angle greater than about −45° relative to said first direction, and
   wherein when said heating mat is laid substantially in a plane, said first plurality of fibers extend in a first direction and said second plurality of fibers extend in a second direction different from the first direction.

22. A rotor blade of a helicopter comprising:
   a body; and
   a heating mat arranged in said body and configured to supply heat to said body, said heating mat including a woven fabric formed with bundles of conductive fibers oriented in a first direction and bundles of conductive fibers oriented in a second direction different from the first direction when said heating mat is laid substantially in a plane,
   wherein said first direction defines a positive angle smaller than about +45° relative to a direction perpendicular to a longitudinal direction of said body, and
   wherein said second plurality of fibers defines a negative angle greater than about −45° relative to a direction perpendicular to a longitudinal direction of said body.

23. A structure subject to high strain comprising:
   a body; and
   a heating mat arranged in said body and configured to supply heat to said body, said heating mat including a first plurality of fibers and a second plurality of fibers electrically connected to said first plurality of fibers, said second plurality of fibers being distinct from said first plurality of fibers;
   wherein said first plurality of fibers define a positive angle smaller than about +45° relative to a first direction perpendicular to a longitudinal direction of said body,
   wherein said second plurality of fibers define a negative angle greater than about −45° relative to said first direction, and
   wherein when said heating mat is laid substantially in a plane, said first plurality of fibers extend in a first direction and said second plurality of fibers extend in a second direction different from the first direction.

24. A rotor blade of a helicopter comprising:
   a body; and
   a heating mat arranged in said body and configured to supply heat to said body, said heating mat including a first plurality of fibers and a second plurality of fibers electrically connected to said first plurality of fibers;
   wherein said first plurality of fibers define a positive angle smaller than about +45° relative to a first direction perpendicular to a longitudinal direction of said body,
   wherein said second plurality of fibers define a negative angle greater than about −45° relative to said first direction, and
   wherein said first plurality of fibers and said second plurality of fibers define a plurality of trapezoids, said plurality of trapezoids being configured to scissor open or close when subject to strain.

25. The rotor blade of claim 24, wherein when a surface of the body is in compression, the plurality of trapezoids shrink along a direction of the strain and expand along a direction perpendicular to the direction of the strain, and when the surface of the body is in tension, the plurality of trapezoids expand along the direction of the strain and shrink along the direction perpendicular to the direction of the strain.

\* \* \* \* \*